United States Patent
Tirtowidjojo et al.

(10) Patent No.: US 9,795,941 B2
(45) Date of Patent: Oct. 24, 2017

(54) WEIR QUENCH AND PROCESSES INCORPORATING THE SAME

(71) Applicant: Blue Cube IP LLC, Midland, MI (US)

(72) Inventors: Max M. Tirtowidjojo, Lake Jackson, TX (US); Hua Bai, Lake Jackson, TX (US); Thomas U. Luebbe, Stade (DE); Victor E. McMurray, Baton Rouge, LA (US)

(73) Assignee: BLUE CUBE IP LLC, Midland, MI (US)

( * ) Notice: Subject to any disclaimer, the term of this patent is extended or adjusted under 35 U.S.C. 154(b) by 235 days.

(21) Appl. No.: 14/429,594

(22) PCT Filed: Sep. 29, 2013

(86) PCT No.: PCT/US2013/062507
§ 371 (c)(1),
(2) Date: Mar. 19, 2015

(87) PCT Pub. No.: WO2014/052945
PCT Pub. Date: Apr. 3, 2014

(65) Prior Publication Data
US 2015/0217256 A1 Aug. 6, 2015

Related U.S. Application Data

(60) Provisional application No. 61/707,994, filed on Sep. 30, 2012.

(51) Int. Cl.
*B01J 19/00* (2006.01)
*B01J 4/00* (2006.01)
(Continued)

(52) U.S. Cl.
CPC .......... *B01J 19/0013* (2013.01); *B01J 4/002* (2013.01); *B01J 4/005* (2013.01); *B01J 10/00* (2013.01);
(Continued)

(58) Field of Classification Search
CPC ... B01J 4/002; B01J 4/005; B01J 10/00; B01J 19/0013; B01J 2204/002;
(Continued)

(56) References Cited

U.S. PATENT DOCUMENTS

| 2,119,484 A | 5/1938 | Levine et al. |
| 2,179,378 A | 11/1939 | Metzger |

(Continued)

FOREIGN PATENT DOCUMENTS

| CH | 609022 | 6/1974 |
| CN | 101215220 | 7/2008 |

(Continued)

OTHER PUBLICATIONS

Michigan Technological Univ., "Free-Radical Chlorination with Sulfuryl Chloride", Nov. 15, 2001, 1-7.
(Continued)

*Primary Examiner* — Charles Bushey
(74) *Attorney, Agent, or Firm* — Polsinelli PC (57) ABSTRACT

The present invention provides a weir quench, an apparatus utilizing the weir quench and processes incorporating the same. The weir quench incorporates an inlet having an inner diameter (Di) and an upper chamber having an inner diameter (Duc), wherein the inlet inner diameter (Di) is at least 90% of the upper chamber inner diameter (Duc). The apparatus constitutes a reactor having an outlet with an inner diameter fluidly coupled with the weir quench inlet, wherein the ratio of the reactor oulet inner diameter (Dr) to the weir quench inlet diameter (Di) is greater than one. The weir
(Continued)

quench, and apparatus are advantageously utilized in processes utilizing a limiting reagent.

19 Claims, 6 Drawing Sheets

(51) Int. Cl.
  *F28C 3/06* (2006.01)
  *B01J 10/00* (2006.01)
(52) U.S. Cl.
  CPC ........... *F28C 3/06* (2013.01); *B01J 2204/002* (2013.01); *B01J 2219/00054* (2013.01); *B01J 2219/00123* (2013.01); *B01J 2219/00247* (2013.01); *B01J 2219/00761* (2013.01)
(58) Field of Classification Search
  CPC .... B01J 2219/00123; B01J 2219/00247; B01J 2219/00761; B01J 2219/00054; F28C 3/06
  USPC ....................................... 261/112.1, 151, 153
  See application file for complete search history.

(56) References Cited

U.S. PATENT DOCUMENTS

| | | | |
|---|---|---|---|
| 2,207,193 | A | 7/1940 | Groll |
| 2,299,441 | A | 10/1942 | Vaughan et al. |
| 2,302,228 | A | 11/1942 | Kharasch et al. |
| 2,370,342 | A | 2/1945 | Zellner |
| 2,378,859 | A | 6/1945 | Martin |
| 2,435,983 | A | 2/1948 | Schmerling |
| 2,449,286 | A | 9/1948 | Fairbairn |
| 2,588,867 | A | 3/1952 | Morris |
| 2,630,461 | A | 3/1953 | Sachsse et al. |
| 2,688,592 | A | 9/1954 | Skeeters |
| 2,762,611 | A | 9/1956 | Monroe |
| 2,765,359 | A | 10/1956 | Pichler et al. |
| 2,964,579 | A | 12/1960 | Weller et al. |
| 2,973,393 | A | 2/1961 | Monroe |
| 3,000,980 | A | 9/1961 | Asadorian |
| 3,094,567 | A | 6/1963 | Eaker |
| 3,112,988 | A | 12/1963 | Coldren et al. |
| 3,444,263 | A | 5/1969 | Fernald |
| 3,446,859 | A | 5/1969 | Weil |
| 3,502,734 | A | 3/1970 | Baird |
| 3,525,595 | A | 8/1970 | Zirngibl et al. |
| 3,551,512 | A | 12/1970 | Loeffler |
| 3,558,438 | A | 1/1971 | Schoenbeck |
| 3,585,786 | A * | 6/1971 | Hardison ............. B01D 47/027 261/112.1 |
| 3,651,019 | A | 3/1972 | Asscher |
| 3,676,508 | A | 7/1972 | Krekeler |
| 3,793,809 | A * | 2/1974 | Tomany ................. B01D 47/10 261/112.1 |
| 3,819,731 | A | 6/1974 | Pitt |
| 3,823,195 | A | 7/1974 | Smith |
| 3,871,305 | A * | 3/1975 | Watanabe ................ F23J 15/00 110/119 |
| 3,872,664 | A | 3/1975 | Lohmann |
| 3,914,167 | A | 10/1975 | Ivy |
| 3,920,757 | A | 11/1975 | Watson |
| 3,926,758 | A | 12/1975 | Smith |
| 3,948,858 | A | 4/1976 | Wiersum |
| 3,954,410 | A | 5/1976 | Pohl et al. |
| 3,959,420 | A * | 5/1976 | Geddes ................ B01J 19/0013 261/112.1 |
| 4,038,372 | A | 7/1977 | Colli |
| 4,046,656 | A | 9/1977 | Davis et al. |
| 4,051,182 | A | 9/1977 | Pitt |
| 4,319,062 | A | 3/1982 | Boozalis et al. |
| 4,466,808 | A * | 8/1984 | Koog ................. C10J 3/485 252/373 |
| 4,513,154 | A | 4/1985 | Kurtz |
| 4,535,194 | A | 8/1985 | Woodard |
| 4,614,572 | A | 9/1986 | Holbrook |
| 4,644,907 | A | 2/1987 | Hunter |
| 4,650,914 | A | 3/1987 | Woodard |
| 4,661,648 | A | 4/1987 | Franklin |
| 4,702,809 | A | 10/1987 | Mueller |
| 4,714,792 | A | 12/1987 | Mueller et al. |
| 4,716,255 | A | 12/1987 | Mueller |
| 4,726,686 | A | 2/1988 | Wolf |
| 4,727,181 | A | 2/1988 | Kruper |
| 4,849,554 | A | 7/1989 | Cresswell et al. |
| 4,894,205 | A | 1/1990 | Westerman |
| 4,902,303 | A * | 2/1990 | Den Bleyker ........... C10J 3/485 261/112.1 |
| 4,902,393 | A | 2/1990 | Mueller |
| 4,999,102 | A | 3/1991 | Cox |
| 5,057,634 | A | 10/1991 | Webster |
| 5,132,473 | A | 7/1992 | Furutaka |
| 5,171,899 | A | 12/1992 | Furutaka |
| 5,178,844 | A | 1/1993 | Carter et al. |
| 5,246,903 | A | 9/1993 | Harley |
| 5,254,771 | A | 10/1993 | Cremer |
| 5,254,772 | A | 10/1993 | Dukat |
| 5,254,788 | A | 10/1993 | Gartside |
| 5,262,575 | A | 11/1993 | Dianis |
| 5,315,044 | A | 5/1994 | Furutaka |
| 5,367,105 | A | 11/1994 | Miyazaki et al. |
| 5,397,381 | A * | 3/1995 | Keintzel ................ B01D 53/18 95/213 |
| 5,414,166 | A | 5/1995 | Kim |
| 5,504,266 | A | 4/1996 | Tirtowidjojo et al. |
| 5,684,219 | A | 11/1997 | Boyce |
| 5,689,020 | A | 11/1997 | Boyce |
| 5,811,605 | A | 9/1998 | Tang |
| 5,895,825 | A | 4/1999 | Elsheikh |
| 5,986,151 | A | 11/1999 | Van Der Puy |
| 6,111,150 | A | 8/2000 | Sakyu |
| 6,118,018 | A | 9/2000 | Savidakis |
| 6,160,187 | A | 12/2000 | Strickler |
| 6,187,976 | B1 | 2/2001 | Van Der Puy |
| 6,229,057 | B1 | 5/2001 | Jackson et al. |
| 6,235,951 | B1 | 5/2001 | Sakyu et al. |
| 6,472,573 | B1 | 10/2002 | Yamamoto |
| 6,518,467 | B2 | 2/2003 | Tung et al. |
| 6,538,167 | B1 | 3/2003 | Brown |
| 6,545,176 | B1 | 4/2003 | Tsay |
| 6,551,469 | B1 | 4/2003 | Nair |
| 6,610,177 | B2 | 8/2003 | Tsay |
| 6,613,127 | B1 | 9/2003 | Galloway |
| 6,683,216 | B1 | 1/2004 | Zoeller |
| 6,825,383 | B1 | 11/2004 | Dewkar |
| 6,924,403 | B2 | 8/2005 | Barnes et al. |
| 6,958,135 | B1 | 10/2005 | Filippi |
| 7,117,934 | B2 | 10/2006 | Lomax |
| 7,189,884 | B2 | 3/2007 | Mukhopadhyay |
| 7,226,567 | B1 | 6/2007 | Olbert |
| 7,282,120 | B2 | 10/2007 | Braun |
| 7,297,814 | B2 | 11/2007 | Yada et al. |
| 7,345,209 | B2 | 3/2008 | Mukhopadhyay |
| 7,371,904 | B2 | 5/2008 | Ma et al. |
| 7,378,559 | B2 | 5/2008 | Verwijs |
| 7,396,965 | B2 | 7/2008 | Mukhopadhyay |
| 7,511,101 | B2 | 3/2009 | Nguyen |
| 7,521,029 | B2 | 4/2009 | Guetlhuber |
| 7,588,739 | B2 | 9/2009 | Sugiyama |
| 7,659,434 | B2 | 2/2010 | Mukhopadhyay |
| 7,674,939 | B2 | 3/2010 | Mukhopadhyay |
| 7,687,670 | B2 | 3/2010 | Nappa |
| 7,695,695 | B2 | 4/2010 | Shin |
| 7,714,177 | B2 | 5/2010 | Mukhopadhyay |
| 7,836,941 | B2 | 11/2010 | Song |
| 7,880,040 | B2 | 2/2011 | Mukhopadhyay |
| 7,951,982 | B2 | 5/2011 | Mukhopadhyay |
| 8,058,486 | B2 | 11/2011 | Merkel et al. |
| 8,058,490 | B2 | 11/2011 | Strebelle |
| 8,071,825 | B2 | 12/2011 | Johnson et al. |
| 8,071,826 | B2 | 12/2011 | Van Der Puy |
| 8,076,521 | B2 | 12/2011 | Elsheikh |
| 8,084,653 | B2 | 12/2011 | Tung |

(56) References Cited

U.S. PATENT DOCUMENTS

| | | | |
|---|---|---|---|
| 8,115,038 | B2 | 2/2012 | Wilson |
| 8,123,398 | B2 | 2/2012 | Teshima |
| 8,158,836 | B2 | 4/2012 | Pigamo |
| 8,232,435 | B2 | 7/2012 | Sievert |
| 8,258,353 | B2 | 9/2012 | Tirtowidjojo |
| 8,258,355 | B2 | 9/2012 | Merkel |
| 8,357,828 | B2 | 1/2013 | Okamoto et al. |
| 8,367,867 | B2 | 2/2013 | Zardi et al. |
| 8,383,867 | B2 | 2/2013 | Mukhopadhyay |
| 8,395,000 | B2 | 3/2013 | Mukhopadhyay |
| 8,398,882 | B2 | 3/2013 | Rao |
| 8,487,146 | B2 | 7/2013 | Wilson |
| 8,558,041 | B2 | 10/2013 | Tirtowidjojo et al. |
| 8,581,011 | B2 | 11/2013 | Tirtowidjojo et al. |
| 8,581,012 | B2 | 11/2013 | Tirtowidjojo et al. |
| 8,614,361 | B2 | 12/2013 | Suzuki |
| 8,614,363 | B2 | 12/2013 | Wilson et al. |
| 8,907,148 | B2 | 12/2014 | Tirtowidjojo et al. |
| 8,926,918 | B2 | 1/2015 | Tirtowidjojo et al. |
| 8,933,280 | B2 | 1/2015 | Tirtowidjojo et al. |
| 8,957,258 | B2 | 2/2015 | Okamoto et al. |
| 9,056,808 | B2 | 6/2015 | Tirtowidjojo et al. |
| 9,067,855 | B2 | 6/2015 | Grandbois et al. |
| 2001/0018962 | A1 | 9/2001 | Joshi et al. |
| 2002/0087039 | A1 | 7/2002 | Tung et al. |
| 2002/0110711 | A1 | 8/2002 | Boneberg et al. |
| 2006/0150445 | A1 | 7/2006 | Redding |
| 2006/0292046 | A1 | 12/2006 | Fruchey |
| 2007/0197841 | A1 | 8/2007 | Mukhopadhyay |
| 2007/0197842 | A1 | 8/2007 | Tung |
| 2007/0265368 | A1 | 11/2007 | Rao et al. |
| 2008/0021229 | A1 | 1/2008 | Maughon |
| 2008/0073063 | A1 | 3/2008 | Clavenna et al. |
| 2008/0118018 | A1 | 5/2008 | Schrauwen |
| 2008/0207962 | A1 | 8/2008 | Rao |
| 2009/0018377 | A1 | 1/2009 | Boyce |
| 2009/0030249 | A1 | 1/2009 | Merkel et al. |
| 2009/0099396 | A1 | 4/2009 | Mukhopadhyay |
| 2009/0117014 | A1 | 5/2009 | Carpenter |
| 2009/0203945 | A1 | 8/2009 | Mukhopadhyay |
| 2010/0041864 | A1 | 2/2010 | Kadowaki et al. |
| 2010/0185029 | A1 | 7/2010 | Elsheikh |
| 2010/0263278 | A1 | 10/2010 | Kowoll et al. |
| 2011/0087056 | A1 | 4/2011 | Tirtowidjojo et al. |
| 2011/0172472 | A1 | 7/2011 | Sakyu |
| 2011/0218369 | A1 | 9/2011 | Elsheikh et al. |
| 2011/0251425 | A1 | 10/2011 | Penzel |
| 2012/0065434 | A1 | 3/2012 | Nose |
| 2014/0081055 | A1 | 3/2014 | Tirtowidjojo |
| 2014/0163266 | A1 | 6/2014 | Tirtowidjojo et al. |
| 2014/0179962 | A1 | 6/2014 | Tirtowidjojo et al. |
| 2014/0323775 | A1 | 10/2014 | Grandbois et al. |
| 2014/0323776 | A1 | 10/2014 | Grandbois et al. |
| 2014/0336425 | A1 | 11/2014 | Tirtowdjojo et al. |
| 2014/0336431 | A1 | 11/2014 | Tirtowidjojo et al. |
| 2014/0371494 | A1 | 12/2014 | Tirtowidjojo et al. |
| 2015/0045592 | A1 | 2/2015 | Grandbois et al. |
| 2015/0057471 | A1 | 2/2015 | Tirtowidjojo et al. |
| 2015/0217256 | A1 | 8/2015 | Tirtowidjojo et al. |

FOREIGN PATENT DOCUMENTS

| | | |
|---|---|---|
| CN | 101492341 | 7/2009 |
| CN | 101544535 | 9/2009 |
| CN | 101597209 | 12/2009 |
| CN | 101754941 | 6/2010 |
| CN | 101913979 | 12/2010 |
| CN | 101913980 | 12/2010 |
| CN | 101955414 | 1/2011 |
| CN | 101982227 | 3/2011 |
| CN | 102001911 | 4/2011 |
| CN | 102249846 | 11/2011 |
| CN | 102351637 | 2/2012 |
| DE | 857955 | 12/1952 |
| DE | 209184 | 4/1984 |
| DE | 235631 | 5/1986 |
| DE | 102005044501 | 3/2007 |
| DE | 102010022414 | 12/2011 |
| EP | 0164798 | 12/1985 |
| EP | 0453818 | 10/1991 |
| EP | 1018366 | 12/2000 |
| EP | 1097984 | 5/2001 |
| FR | 1546709 | 11/1968 |
| GB | 471186 | 8/1937 |
| GB | 471187 | 8/1937 |
| GB | 471188 | 8/1937 |
| GB | 857086 | 12/1960 |
| GB | 1134585 | 11/1968 |
| GB | 1381619 | 1/1975 |
| GB | 1548277 | 7/1979 |
| JP | 54079207 | 6/1979 |
| JP | S54-135712 | 10/1979 |
| JP | 08-119885 | 5/1996 |
| JP | 2001213820 | 8/2001 |
| JP | 2006272267 | 10/2006 |
| JP | 2007021396 | 2/2007 |
| JP | 2008063314 | 3/2008 |
| JP | 2009000592 | 1/2009 |
| JP | 2009046653 | 3/2009 |
| JP | 2001151708 | 6/2011 |
| JP | 2011144148 | 7/2011 |
| LU | 52247 | 12/1966 |
| SU | 899523 | 1/1982 |
| WO | 0138271 | 5/2001 |
| WO | 0138275 | 5/2001 |
| WO | 2005016509 | 2/2005 |
| WO | 2007079431 | 7/2007 |
| WO | 2007079435 | 7/2007 |
| WO | 2007096383 | 8/2007 |
| WO | 2008054781 | 5/2008 |
| WO | 2009015304 | 1/2009 |
| WO | 2009067571 | 5/2009 |
| WO | 2009087423 | 7/2009 |
| WO | 2011060211 | 5/2011 |
| WO | 2011065574 | 6/2011 |
| WO | 2012011844 | 1/2012 |
| WO | 2012081482 | 12/2012 |
| WO | 2012166393 | 12/2012 |
| WO | 2012166394 A1 | 12/2012 |
| WO | 2013082410 | 6/2013 |
| WO | 2014046970 | 3/2014 |
| WO | 2014046977 | 3/2014 |
| WO | 2014066083 | 5/2014 |
| WO | 2014100039 | 6/2014 |
| WO | 2014100066 | 6/2014 |
| WO | 2014134233 | 9/2014 |
| WO | 2014134377 | 9/2014 |
| WO | 2014164368 | 10/2014 |

OTHER PUBLICATIONS

Bai, et al., "Isomerization of Tetrachloropropene to Promote Utilization Ratio of Triallate Raw Materials", Petrochemical Technology & Application, 2007, 25(1).

Boualy, et al., "Kharasch Addition of Tetrachloromethane to Alkenes Catalyzed by Metal Acetylacetonates", "Kharasch Addition of Tetrachloromethane to Alkenes Catalyzed by Metal Acetylacetonates", 2011.

Chai, et al., "Study of Preparation of 1,1,1,3-tetrachloropropane", Zhejiang Chemical Industry, 2010, pp. 1-3, 41(5).

Cristiano, et al., "Tetraalkylphosphonium Trihalides. Room Temperature Ionic Liquids As Halogenation Reagents", J. Org. Chem., 2009, pp. 9027-9033, 74.

Evstigneev, et al., "Initiated Chlorination of Tetrachloropropane", Khim. Prom., 1984, pp. 393-394, 16(7).

Fields, et al., "Thermal Isomerization of 1,1-dichlorocyclopropanes", Chemical Communications, Jan. 1, 1967, p. 1081, 21.

Galitzenstein, et al., "The Dehydrochlorination of Propylene Dichloride", Journal of the Society of Chemical Industry, 1950, pp. 298-304, 69.

(56) References Cited

OTHER PUBLICATIONS

Gault, et al., "Chlorination of Chloroform", Comptes Rendus Des Seances De L'Academie des Sciences, 1924, pp. 467-469, 179.

Gerding, et al., "Raman Spectra of aliphatic chlorine compounds: chloroethenes an chloropropenes", Recueil Jan. 1, 1955, pp. 957-975, 74.

Hatch, et al., "Allylic Chlorides. XV. Preparation and Properties of the 1,2,3Trichloropropenes", JACS, Jan. 5, 1952, pp. 123-126, 74.

Hatch, et al., "Allylic Chlorides. XVIII. Preparation and Properties of 1,1,3-tricholoro-2-fluoro-1-propene and 1,1,2,3-tetrachloro-1-propene", JACS, Jul. 5, 1952, pp. 3328-3330, 74(13).

Herzfelder, "Substitution in the Aliphatic Series", Berichte Der Deutschen Chemischen Gesellschaft, May-Aug. 1893, pp. 1257-1261, 26(2).

Huaping, et al., "Procress in Synthesis of 1,1,1,3-tetrachloropropane", Guangzhou Chemicals, 2011, pp. 41-42, 39 (5).

Ivanov, et al., "Metal phthalocyanine-Catalyzed Addition of polychlorine-Containing Organic Compounds to C=C Bonds", Russian Chemical Bulletin, International Edition, Nov. 2009, pp. 2393-2396, 58(11).

Kang, et al., "Kinetics of Synthesis of 1,1,1,3,3-pentachlorobutane Catalyzed by Fe-FeCl3", Chemical Research and Application, Jun. 2011, pp. 657-660, 23(6).

Kharasch, et al., "Chlorinations with Sulfuryl Chloride.I. The Peroxide-Catalyzed Chlorination of Hydrocarbons", JACS, 1939, pp. 2142-2150, 61.

Khusnutdinov, et al., "CCl4 Attachment to Olefins Catalyzed by Chromium and Ruthenium Complexes. Impact of Water as a Nucleophilic Admixture", Oil Chemistry, 2009, pp. 349-356, vol. 4.

Kruper, et al., "Synthesis of alpha-Halocinnamate Esters via Solvolytic Rearrangement of Trichloroallyl Alcohols", J. Org Chem, 1991, pp. 3323-3329, 56.

Leitch, "Organic Deuterium Compounds: V. The chlorination of propyne and propyne D-4", Canadian Journal of Chemistry, Apr. 1, 1953, pp. 385-386, 30(4).

Levanova, et al., "Cholorination of Chloroolefins C3-C4", 2002, 496-498.

Levanova, et al., "Thermocatalytic Reactions of Bromochloropropanes", Russian Journal of Physical Chemistry, Jan. 1, 1983, pp. 1142-1146, 57.

McBee, et al., "Utilization of Polychloropropanes and Hexachloroethane", Industrial and Engineering Chemistry,Feb. 1, 1941, pp. 176-181, 33(2).

Mouneyrat, "Effect of Chlorine on Propyl Chloride in the Presence of Anhydrous Aluminum Chloride", Bulletin de la Societe chimique de france, Societe francaise de chimie, Jan. 1, 1899, pp. 616-623, 21(3).

Munoz-Molina, et al., "An Efficient, Selective and Reducing Agent-Free Copper Catalyst for the Atom-Transfer Radical Addition of Halo Compounds to Activated Olefins", Inorg. Chem., 2010, pp. 643-645, 49.

Nair, et al., "Atom Transfer Radical Addition (ATRA) of Carbon Tetrachloride and Chlorinated Esters to Various Olefins Catalyzed by CP/Ru(PPh3)(PR3)CI Complexes", Inorganica Chimica Acta, 2012, pp. 96-103, 380.

Nguyen, et al., "Condensation de chloroforme avec des olefins fluorees en milieu basique", Journal of Fluorine Chemistry, Dec. 1, 1991, pp. 241-248, 55(3).

Nikishin, et al., "Reactions of Methanol and Ethanol with Tetrachloroethylene", Izvestiya Akademii Nauk SSSR, Seriya Khimicheskaya, Dec. 1966, pp. 2188-2192, 12.

Ochi, et al., "Preparation of Chloropropenes by Photochemical Dehydrochlorination of 1,2-Dichloropropane", Chemical Abstracts, Jul. 17, 1989, p. 574, 111(3).

Pozdnev, et al., "Chlorination of chloroform and the conversion of methylene chloride manufacture still residues", Khim., Khim. Tekhnol., 1970, 70(4).

Rotshtein, et al., "Isomer Distribution on Chlorination of Chloropropanes", Z. Organicheskoi Khimii, 1966, pp. 1539-1542, 2(9).

Semenov, "Selectivity of Photochemical Chlorination of Chloromethane in the Liquid Phase", Prikladnei Khimii, 1985, pp. 840-845, 58(4).

Shelton, et al., "Addition of Halogens and Halogen Compounds to Allylic Chlorides. I. Addition of Hydrogen Halides", Journal of Organic Chemistry, 1958, pp. 1876-1880, 23.

Skell, et al., "Reactions of BrCl with alkyl radicals", Tetrahedron letters, 1986 pp. 5181-5184, 27(43).

Skell, et al., "Selectivities of pi and sigma succinimidyl radicals in substitution and addition reactions, Response to Walling, WI-Taliawi and Zhao", JACS, Jul. 1, 1983, pp. 5125-5131, 105(15).

Stevens, "Some New Cyclopropanes with a Note on the Exterior Valence Angles of Cyclopropane", JACS, Vo. 68, No. 4, 1945, 620-622.

Tanuma, et al., "Partially Fluorinated Metal Oxide Catalysts for a Friedel-Crafts-type Reaction of Dichlorofluoromethane with Tetrafluoroethylene", Catal. Lett., 2010, pp. 77-82, 136.

Tobey, et al., "Pentachlorocyclopropane", Journal of the American Chemical Society, Jun. 1, 1996, pp. 2478-2481, 88 (11).

Urry, et al., "Free Radical Reactions of Diazomethane with Reactive Bromopolychloroalkane", JACS, May 5, 1964, pp. 1815-1819, 86(9.

Wang Chin-Hsien, "Elimination Reactions of polyhalopropanes under emulsion catalytic conditions to give Halopropenes", Synthesis, Jan. 1, 1982, pp. 494-496, 1982(6).

Zhao, et al., "Research Progress on Preparation Technology of 1,1,2,3-Tetrachloropropene", Zhejiang Chemical Industry, 2010, pp. 8-10, 41(6).

Zheng, et al., "Preparation of the low GWP alternative 1,3,3,3-tetrafluoropropene", Zhejiang Huagong, 2010, pp. 5-7, 41(3).

* cited by examiner

WEIR QUENCH AND PROCESSES INCORPORATING THE SAME

FIELD

The present invention relates to an efficient and effective weir quench, and an apparatus comprising a reactor and the weir quench. Processes incorporating the same are also provided.

BACKGROUND

Hydrofluorocarbon (HFC) products are widely utilized in many applications, including refrigeration, air conditioning, foam expansion, and as propellants for aerosol products including medical aerosol devices. Although HFC's have proven to be more climate friendly than the chlorofluorocarbon and hydrochlorofluorocarbon products that they replaced, it has now been discovered that they exhibit an appreciable global warming potential (GWP).

The search for more acceptable alternatives to current fluorocarbon products has led to the emergence of hydrofluoroolefin (HFO) products. Relative to their predecessors, HFOs are expected to exert less impact on the atmosphere in the form of a lesser or no detrimental impact on the ozone layer and their much lower GWP as compared to HFC's. Advantageously, HFO's also exhibit low flammability and low toxicity.

As the environmental, and thus, economic importance of HFO's has developed, so has the demand for precursors utilized in their production. Many desirable HFO compounds, e.g., such as 2,3,3,3-tetrafluoroprop-1-ene or 1,3,3,3-tetrafluoroprop-1-ene, may typically be produced utilizing feedstocks of chlorocarbons or chlorofluorocarbons, and in particular, chlorinated propenes.

Unfortunately, many chlorinated propenes may have limited commercial availability, and/or may only be available at potentially prohibitively high cost, due at least in part to the propensity of the conventional processes typically utilized in their manufacture to result in the production of large quantities of waste and/or by-products. For example, many conventional processes for the production of chlorinated propenes require only partial conversion of the limiting reagents, so that excessive conversion of the same results in the production of large quantities of by-products. Excess waste may be produced in trying to limit conversion to the desired level by quenching the reaction with water, or other aqueous solvents, since use of the same in a chlorination process can result in the production of large quantities of aqueous HCl that is of lower value than anhydrous HCl. Quenching such reactions with nonaqueous solvents can also be suboptimal, since any amount of backmixing or increased residence time of unconverted limiting reagents, no matter in what solvent, can lead to undesirable conversion levels, and a reduction in reaction selectivity.

Any such waste and/or by-products produced not only have to be separated from the final product and disposed of, but also, can result in system fouling prior to doing so. Both of these outcomes can introduce substantial expense, further limiting the commercial potential of processes in which the production of such waste and/or by-products is not reduced or eliminated. Further, these problems become exacerbated on process scale-up, so that large scale processes can become cost prohibitive quickly.

Quench mechanisms utilizing nonaqueous solvents have been proposed, but have been proposed for use in connection with quench designs that are inappropriate for use in many processes for the production of chlorinated propenes. That is, conventional weir or spray quench designs may typically result in an amount of backmixing occurring that, while acceptable within the context in which these quench designs are used, is unacceptable in processes in which high conversion rates can result in the formation of unacceptable amounts of by-products. Also, in order to provide the amount of cooling desired, conventional quench mechanisms capable of utilizing organic cooling fluids are typically designed to accommodate a very high flow rate of process and/or quench fluid.

It would thus be desirable to provide improved processes for the production of chlorocarbon precursors useful in the synthesis of HFO's. More particularly, reduction in the amount of waste and/or by-products that are produced, without undesirable increases in conversion rates or decreases in reaction selectivity, or improved methods of cost-effectively managing any by-products and/or waste products that are produced, would provide significant commercial advantage.

BRIEF DESCRIPTION

A weir quench that provides such advantages is provided herein. More specifically, the weir quench utilizes a nonaqueous process fluid as the quench flow, so that production of aqueous acidic waste products, as can be seen if water or aqueous solvents are used as quench liquids, can be reduced or eliminated. Furthermore, the weir quench incorporates at least one or more design features that can enhance the operation thereof, e.g., as by providing for reduced backmixing of the reaction effluent, minimizing or eliminating plugging within the weir quench, reducing load on any pump associated with the quench apparatus, etc. As a result, desired conversions may be substantially maintained, formation of by-products may be minimized and/or fouling may be reduced or eliminated. Aside from the cost savings provided by utilizing a weir quench as opposed to more costly quench formats, e.g., spray quenching, savings are further provided by minimizing, or avoiding entirely, the costs associated with separating and disposing of, waste and/or by-products and/or process downtime to clean foulants from the system. In some embodiments, anhydrous hydrogen chloride can be produced, rather than aqueous hydrogen chloride. Anhydrous HCl can be repurposed, or even sold at a higher price than that obtainable for aqueous hydrogen chloride.

In one aspect of the present invention, a weir quench is provided. The weir quench comprises an inlet having an inner diameter and an upper chamber having an inner diameter, wherein the inlet inner diameter is at least 90% of the upper chamber inner diameter. The weir quench further comprises at least one downcomer having a length and an inner diameter, wherein the ratio of the inlet inner diameter to the downcomer inner diameter is greater than or equal to 2, or 3, or greater than or equal to 4. Desirably, the ratio of the inlet inner diameter to the downcomer inner diameter is less than 6, and may be less than 5. The at least one downcomer may have an inner diameter of 0.5 inch or greater and in some embodiments, may be from 1 inch to 16 inches. The ratio of the downcomer length to the downcomer inner diameter may desirably be greater than 1.5, or greater than 2, or greater than 3, or greater than 4. The ratio of the downcomer length to the downcomer inner diameter may desirably be less than 20, or less than 12, or less than 8, or less than 5. An outlet of the downcomer may be fluidly disposed in relation to a lower chamber. In some embodiments, the lower chamber may comprise a baffle, e.g., a roof baffle.

The advantageous dimensional relationships of the weir quench may be further leveraged when the weir quench is utilized in connection with a reactor, and indeed; additional dimensional relationships between the reactor outlet and the weir quench have been discovered that further assist in realizing the full benefits of both.

And so, in another aspect, there is provided an apparatus comprising a reactor having an outlet with an inner diameter and a weir quench having an inlet with an inner diameter, wherein the ratio of the reactor outlet inner diameter and weir quench inlet inner diameter is one or greater. The weir quench comprises an inlet having an inner diameter and an upper chamber comprising an inner diameter, wherein the inlet inner diameter is at least 90% of the upper chamber inner diameter. The weir quench further comprises at least one downcomer having a length and an inner diameter, wherein the ratio of the inlet inner diameter to the downcomer inner diameter is greater than or equal to 2, or greater than or equal to 3, or greater than or equal to 4. The ratio of the inlet inner diameter to the downcomer inner diameter is less than 6, and may be less than 5 in some embodiments. The at least one downcomer has an inner diameter of 0.5 inch or greater and in some embodiments, has an inner diameter of from 1 inch to 16 inches. The ratio of the downcomer length to the downcomer inner diameter may desirably be greater than 1.5, or greater than 2, or greater than 3, or greater than 4. The ratio of the downcomer length to the downcomer inner diameter may desirably be less than 20, or less than 12, or less than 8, or less than 5.

Since the present reactors are expected to provide time and cost savings to the gaseous processes in which they are utilized, such processes are also provided. Processes comprising a limiting reagent find particular benefit.

In another aspect, processes for quenching a gaseous product stream from a chemical process are provided. The processes comprise providing the gaseous product stream from a reactor having an outlet with an inner diameter to a weir quench having an inlet with an inner diameter. The ratio of the reactor outlet inner diameter to the weir quench inlet inner diameter is at least one.

The mass flow ratio of the quench liquid flow to the gaseous effluent is at least 1, or at least 2, or at least 3 or at least 4. In some embodiments, the mass flow ratio of the quench flow to the gaseous effluent is less than 8, or less than 7, or less than 6, or less than 5. The weir quench may be used in processes in which the flow velocity of the effluent is less than 10 ft./s, or less than 1 ft./s. In some embodiments, the temperature of the quench flow is greater than 20° C., while in others, it may be less than 250° C. In some embodiments, the temperature of the quench flow is from 20° C. to 250° C.

BRIEF DESCRIPTION OF THE DRAWINGS

These and other features, aspects, and advantages of the present invention will become better understood when the following detailed description is read with reference to the accompanying drawings, wherein.

DETAILED DESCRIPTION

The present specification provides certain definitions and methods to better define the present invention and to guide those of ordinary skill in the art in the practice of the present invention. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not intended to limit the part being described limited to any one position or spatial orientation.

If ranges are disclosed, the endpoints of all ranges directed to the same component or property are inclusive and independently combinable (e.g., ranges of "up to 25 wt. %, or, more specifically, 5 wt. % to 20 wt. %," is inclusive of the endpoints and all intermediate values of the ranges of "5 wt. % to 25 wt. %," etc.). As used herein, percent (%) conversion is meant to indicate change in molar or mass flow of reactant in a reactor in ratio to the incoming flow, while percent (%) selectivity means the change in molar flow rate of product in a reactor in ratio to the change of molar flow rate of a reactant.

The present invention provides a weir quench suitable for use in a gas-phase process, such as processes for the production of chlorinated and/or fluorinated propenes and/or higher alkenes. The weir quench mechanism incorporates one or more design features that can i) provide for reduced backmixing of the reaction effluent, and/or ii) minimize or eliminate plugging within the quench apparatus. As a result, desired conversions may be substantially maintained, formation of by-products may be minimized and/or fouling may be reduced or eliminated. Further, the advantages provided by one design feature may be leveraged, perhaps even synergistically, by combining the same with others.

More specifically, the weir quench comprises an inlet having an inner diameter ($D_i$) and upper chamber having an inner diameter ($D_{uc}$). The inlet inner diameter ($D_i$) is desirably at least 90%, or at least 92%, or at least 94%, or at least 96%, or at least 98%, or even substantially equal in diameter to the inner diameter of the upper chamber ($D_{uc}$). Since the inlet and upper chamber inner diameters are within 90% of each other, the backmixing zone that can result at this interface when there is a greater difference in diameter between the two is minimized, or even eliminated. While a backmixing zone can be desirable in some applications to increase heat transfer and cooling rate, areas of backmixing are suboptimal in processes wherein conversion of the reactants is desirably limited and/or when the product stream desirably cooled is sensitive to decomposition.

In some embodiments, the weir quench may also have at least one downcomer tube having a length ($L_d$) and inner diameter ($D_d$), wherein the ratio of the inlet inner diameter (Di) to the downcomer inner diameter ($D_d$) is at least 2, or at least 3, or at least 4. The ratio of the inlet inner diameter ($D_i$) to the downcomer inner diameter ($D_d$) is desirably less than 6, or less than 5. In some embodiments, the ratio of the inlet inner diameter ($D_i$) to the downcomer inner diameter ($D_d$) may be from 3 to 6, or from 4 to 5. Providing the weir quench with such a relationship has been found to provide optimum flow velocity, residence time, turbulence and heat transfer between the quench liquid and the product stream desirably being quenched. This relationship has also been found to assist in the provision of a continuous falling film liquid coverage on the downcomer inner diameter to avoid dry spots, and the hot/cold cycling that can result when the same occur.

In some embodiments, the weir quench may be provided with additional features and/or dimensional relationships that further enhance its suitability for use in connection with processes comprising a limiting reagent. More particularly, in some embodiments, the weir quench may be provided with one or more design features to reduce or eliminate plugging. Since conventional processes employing a weir quench may typically provide extremely high flow rates of gaseous effluent, plugging anywhere within the process may typically not be an issue, and even if it were, may not result in the formation of excessive quantities of waste and/or by-products when no limiting reagent is in use. However, in processes wherein the use of a limiting reagent is required, plugging can not only result in the formation of undesirable quantities of such by and waste products, but can also result in reactor fouling.

One such feature is the optimization of the inner diameter of the weir quench downcomer ($D_d$). The inner diameter of the at least one downcomer ($D_d$) is desirably at least 0.5 inch, and in some embodiments, may be from 1 inch to 16 inches, as may be influenced by the scale of the process. Furthermore, the ratio of the downcomer length ($L_d$) to its inner diameter ($D_d$) can be optimized so that sufficient quench performance is achieved without an overly large, and expensive weir quench. A ratio of downcomer length ($L_d$) to downcomer inner diameter ($D_d$) of at least 1.5, or at least 2, at least 3, or at least 4 has been discovered to be optimal. Desirably, the ratio of downcomer length ($L_d$) to downcomer inner diameter ($D_d$) will be less than 20, or less than 12, or less than 8, or less than 5. In some embodiments, the ratio of downcomer length to downcomer inner diameter may be from 1.5 to 20, or from 2 to 12, or from 3 to 8, or from 4 to 5. Another feature that has been discovered to reduce or minimize plugging in the weir quench is the placement of the outlet of the downcomer tube at least 0.1 inch below the ceiling of the lower chamber ($L_{od}$) quench inlet at least one inch above a quench reservoir bottom.

The performance of the weir quench may further be optimized via the utilization of a baffle, e.g., such as a roof baffle, in a lower chamber thereof. The axi-symmetrical roof baffle is preferably angled at an angle $A_b$ relative to an axis perpendicular to the longitudinal axis of the downcomer. Desirably, the angle $A_b$ will be greater than or equal to 0.1 degree, or greater than or equal to 1 degree, or greater than or equal to 2 degrees. It has now been discovered that the placement of such a baffle can also act to reduce or eliminate any gas entrainment that may otherwise occur in the lower pool of liquid that collects in operation of the weir quench. Gas entrainment in this lower liquid pool can affect the performance of a pump used to assist in flow through the weir quench. The use of a roof baffle may also assist liquid-gas separation and enhance heat exchange.

One or more of the described features may advantageously be employed in the weir quench, wherein their advantages are expected to be cumulative, and perhaps synergistic. For example, any two, any three, any four, or all of the design concepts may be employed. More specifically, the weir quench may have a ratio of the inlet inner diameter ($D_i$) to the upper chamber inner diameter ($D_{uc}$) of from 0.9 to 1, and i) a ratio of the inlet inner diameter ($D_i$) to the downcomer inlet diameter ($D_d$) of greater than 2, and/or ii) an inner diameter of at least one downcomer ($D_d$) of at least 0.5 inch and/or iii) a ratio of downcomer length ($L_d$) to downcomer inner diameter ($D_d$) of from 1.5 to 20, and/or iv) comprise a downcomer tube exit with a distance $L_{ob}$ below the roof of the lower chamber, and/or v) comprise a reservoir further comprising a roof baffle. In some embodiments, but not necessarily all, any such roof baffle may be angled ($A_b$) at least 0.1 degrees relative to an axis perpendicular to the longitudinal axis of the downcomer. Table 1 shows the possible dimensional relationships that may be optimized in the weir quench and possible values/ranges for each.

TABLE 1

| Dimension | First Embodiment | Second Embodiment | Third Embodiment |
|---|---|---|---|
| $D_d$ | ≥0.5 inch | ≥1.0 inch | ≥3.0 inch |
| $L_{ob}$ | ≥0. Inch | ≥0.5 inch | ≥1.0 inch |
| $A_b$ | ≥0° | ≥1° | ≥2° |
| $D_i/D_{uc}$ | 0.9 | 0.95 | 1 |
| $D_i/D_d$ | ≥2 | ≥3 | ≥4 |
| $L_d/D_d$ | 3-8 | 4-7 | 4-5 |

In some embodiments, the inlet of the weir quench may desirably be operably disposed relative to the a reactor generating the product stream to be cooled, i.e., the weir quench inlet may be directly coupled to a reactor outlet, or to any other conduit, such as a collector or a transfer line, linking the process to the weir quench and capable of delivering the gaseous product stream to the weir quench. Any such conduit is desirably configured so as to be substantially the same shape as the fluid flow from the reactor, e.g., to be substantially tubular or conical. Any such conduit will also desirably be placed about the same longitudinal axis as the weir quench.

Whether directly attached to the reactor, or to a conduit there between, the ratio of the inner diameter of the reactor outlet/conduit ($D_r$) and the inner diameter of the weir quench inlet ($D_i$) is desirably 1 or greater. Such a relationship has now been discovered to prohibit the formation of areas of backmixing in the dead space that may otherwise be created by disparate geometries between the reactor/conduit and weir quench inlet, or by a ratio of reactor/conduit inner diameter to weir quench inlet inner diameter of less than one.

More specifically, conventional weir quenches for high temperature gaseous effluents have typically been coupled to reactors having an inner diameter such that the ratio of the reactor inner diameter to the weir quench inlet inner diameter of less than one. Although this weir quench design can effectively cool product streams from processes without a limiting reagent, this design has been found to be inadequate, and in some instances, actually detrimental to processes in which a limiting reagent is used, in that it appeared to contribute to the formation of large quantities of waste and by-products. Further investigation lead to the discovery that these byproducts are formed by further reactions of the desired products in the backmixing zone that typically exists in at the junction between the reactor and conventional weir quench mechanism inlets. Provision of the dimensional relationship, e.g., a ratio of the reactor outlet inner diameter ($D_r$) to the weir quench inlet inner diameter ($D_i$) of 1 or more, substantially eliminates the backmixing zone that results from conventional weir quench/reactor apparatus. Desirably, the ratio of the reactor inner diameter ($D_r$) to the weir quench inlet inner diameter ($D_i$) is not less than 1.

Figure 1:
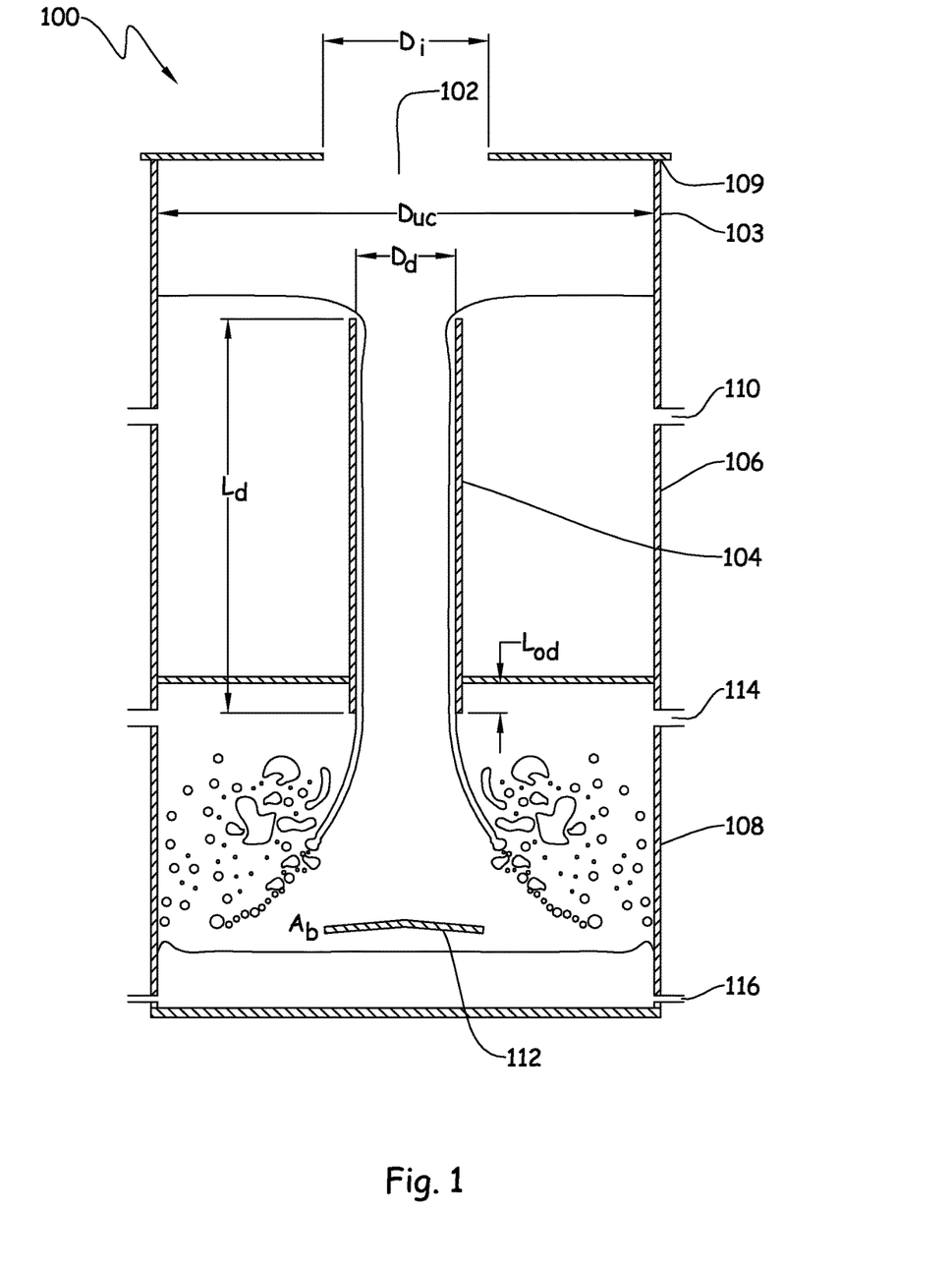
FIG. 1 is a schematic representation (not to scale) of one embodiment of the weir quench.

A weir quench in accordance with one embodiment is shown in FIG. 1. As shown in FIG. 1, weir quench 100 comprises an inlet 102 having an inner diameter D, an upper chamber 103 (above the liquid quench surface) with inner diameter $D_{uc}$, a single downcomer tube 104 having an inner diameter $D_d$ and a length $L_d$, a quench chamber 106 (containing the liquid quench), and a lower chamber 108. Quench chamber 106 has a quench liquid inlet(s) 110, operably disposed to provide quench liquid, desirably a nonaqueous process liquid, to quench chamber 106. Lower chamber 108 houses roof baffle 112, and further is provided with gas vents 114 and liquid drain 116. Roof baffle 112 is provided at an angle $A_b$ relative to an axis perpendicular to the longitudinal axis of downcomer 104.

In operation, gaseous reactor effluent enters weir quench 100 at inlet 102 before, during, or after, quench liquid has been provided into upper chamber 106 via quench liquid inlet(s) 110. As the volume of quench liquid establishes a depth exceeding the height of downcomer 104 in upper chamber 106, quench liquid flows over the top, and down the sides, of downcomer 104, and into lower chamber 108. The gaseous reactor effluent contacts the quench liquid at the top surface thereof, as well as within downcomer 104. Quench liquid and gaseous reactor effluent flows into lower chamber 108, and at least some portion thereof may contact baffle 112. Product is collected out of liquid drain 116.

Figure 2:
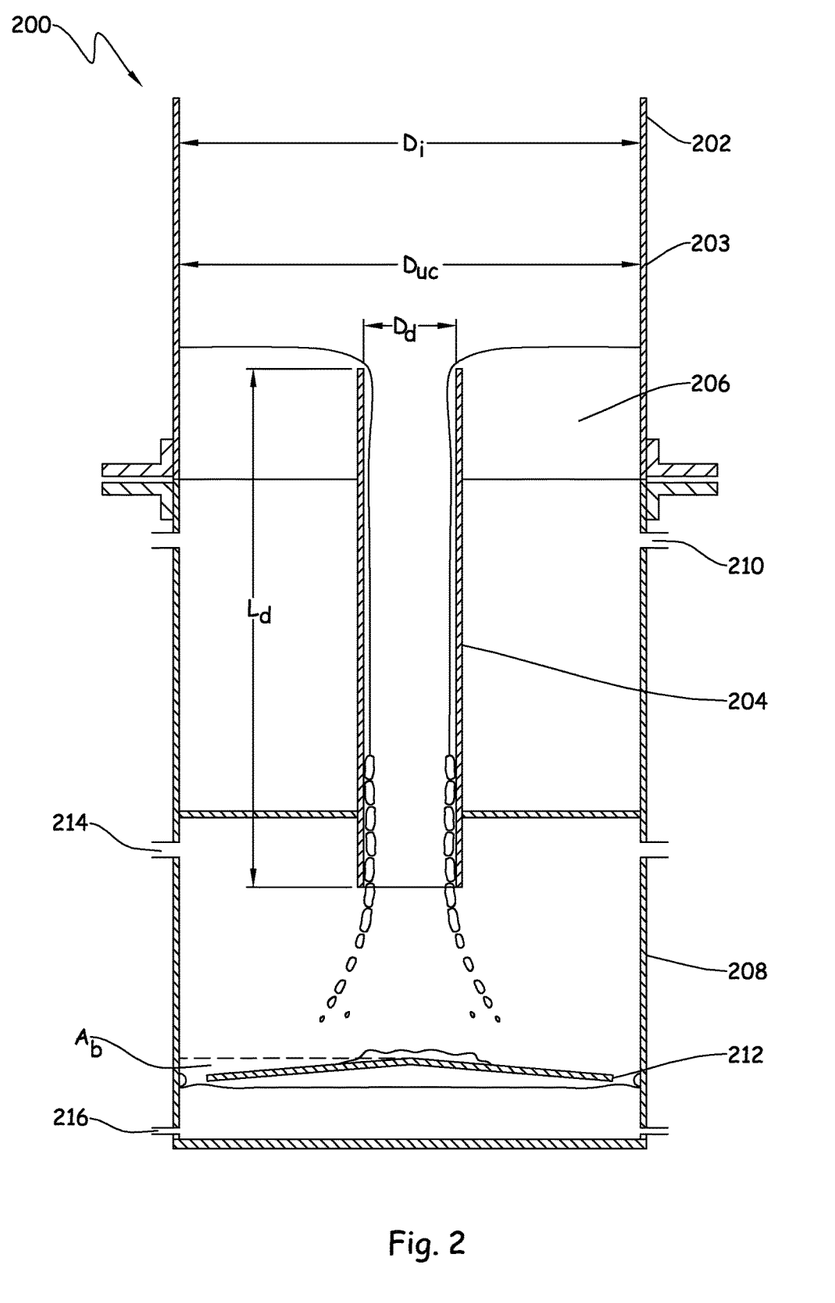
FIG. 2 is a schematic representation (not to scale) of another embodiment of the weir quench.

A weir quench according to another embodiment is shown in FIG. 2. As shown in FIG. 2, weir quench 200 comprises the same features as weir quench 100, with different dimensional relationships there between. That is, weir quench 200 comprises inlet 202 having an inner diameter $D_i$, an upper chamber 203 (above the liquid quench surface) with inner diameter $D_{uc}$, a single downcomer 204 having an inner diameter $D_d$ and a length $L_d$, a quench chamber 206 (containing the liquid quench), and a lower chamber 208. Quench chamber 206 has a quench liquid inlet(s) 210, operably disposed to provide quench liquid, desirably a nonaqueous process liquid, to quench chamber 206. Lower chamber 208 houses roof baffle 212, and further is provided with gas vents 214 and liquid drains 216. Roof baffle 212 is provided at an angle $A_b$ relative to an axis perpendicular to the longitudinal axis of downcomer 204.

Figure 3A:
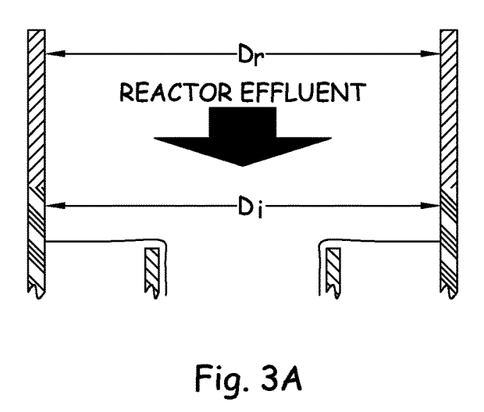
FIG. 3A is a schematic representation of a weir quench according to one embodiment, e.g., having an inlet with an inner diameter ($D_i$) fluidly connected to a reactor having an outlet with an inner diameter ($D_r$), wherein the ratio between the reactor outlet inner diameter ($D_r$) and the weir quench inlet inner diameter ($D_i$) is one or greater.

In some embodiments, the weir quench may be coupled to a reactor, or reactor outlet or outlet conduit. In such embodiments, ratio of the inner diameter of the reactor outlet ($D_r$) to the inner diameter of the weir quench inlet ($D_i$) is desirably 1 or greater. One example of such an embodiment is shown in FIG. 3A. As shown in FIG. 3A, the ratio of $D_r$ to $D_i$ is approximately 1. The provision of such a relationship eliminates the backmixing zone created by conventional weir quench/reactor apparatus, shown in FIG. 3B.

The present weir quench provides significant advantages when used in connection with chemical processes comprising a limiting reagent for which it was designed, and such processes are also provided. Incorporating the present weir quench into such a process can reduce, or even eliminate backmixing that may occur in conventional weir quench, so that substantial variances in conversions are not seen. Indeed, processes performed using the present weir quench can be provided with minimized production of by-products and/or decomposition products such that variances of less than 2%, or even less than 1%, from the desired conversion, are seen. Selectivity may also be substantially maintained, or is expected to decrease by no more than 2%. Such reactions may also typically include at least one limiting reactant having desired conversions that are far from exhaustion, e.g., conversions of less than 80%, or less than 40%, or even less than 20%.

One specific example of such reactions, includes those for the production of chlorinated propenes. Typically, the product stream from such processes is gaseous, and may be at temperatures of 380° C. or greater. At this high temperature, the byproducts produced by the process could form deposits on the reactor inner surfaces. These deposits may decompose over time to form carbonaceous deposits that may ultimately shorten reactor lifetimes, and lower overall process productivity.

Conventionally, spray quenching has typically been utilized to cool high temperature gaseous effluents. However, spray quenching can be energy intensive, at least in the energy required to atomize the large volumes of coolant required, and can become prohibitively so on a large scale.

Although some have proposed weir quench mechanisms for the cooling of high temperature gaseous effluents, prior to the invention described herein, weir quenching had either been utilized with aqueous solutions, leading to the attendant problems therewith described above, and/or, had not been applied in a manner that resulted in a reduction in formation of by-products so that a desired conversion can be seen.

Further, weir quenching has typically been utilized to quench gaseous effluents having an extremely high flow rate, e.g., at least 100 ft./s, presumably because the understanding in the art was that such high flow rates were required to provide adequate heat transfer and thus, desired quench rates. Due to the residence times required, process flow rates associated with the gas phase production of chlorinated propenes are much lower, e.g., 35 ft./s or less. Conventional weir quench designs, requiring flows of 100 ft./s or greater are thus expected to perform suboptimally when utilized in such processes.

It has also now been discovered that not only can more effective heat management be provided by utilizing a non-aqueous process fluid, but also, avoiding the use of an aqueous quench flow actually reduces the costs associated with heating or cooling the same to the desired temperature and/or removal of the same or by-products generated thereby.

The present weir quench designs, having one or more of the above described design features, are also well suited for use in such processes, comprising gas effluent flow rates of less than 10 ft./s, or less than 1 ft./s, or even as low as 0.1 ft./s. Indeed, the present weir quench may provide optimized residence time, turbulence and thus heat transfer between the gaseous product stream and quench flow when supplied with a mass flow ratio of quench liquid flow to gaseous product stream of 1, or 2, or 3, or 4, or higher. In some embodiments, the mass flow ratio of quench liquid flow to gaseous product stream is 8, or 7, or 6, or 5, or lower. The optimized quenching efficiency and cost effectiveness may be provided by mass flow ratios of quench flow to gaseous product stream flow of from 1 to 8, or from 2 to 7, or from 3 to 6, or from 4 to 5.

The design of the weir quench can provide efficient quenching when a quench flow having a relatively high temperature is utilized. That is, the temperature of the quench flow, e.g., of the nonaqueous process liquid, may desirably be greater than 20° C., or greater than 50° C., or greater than 100° C. In some embodiments, the temperature of the nonaqueous process liquid may be less than 250° C., or less than 170° C., or less than 160° C., or less than 150° C. In other embodiments, the temperature of the quench flow may be from 20° C. to 250° C.

The efficiencies provided by the present reactors can be further leveraged by providing the chlorinated and/or fluorinated propene and higher alkenes produced therein to further downstream processes. For example, 1,1,2,3-tetrachloropropene produced using the described reactors can be processed to provide further downstream products including hydrofluoroolefins, such as, for example, 2,3,3,3-tetrafluoroprop-1-ene (HFO-1234yf) or 1,3,3,3-tetrafluoroprop-1-ene (HFO-1234ze). Improved methods for the production of hydrofluoroolefins, 2,3,3,3-tetrafluoroprop-1-ene (HFO-1234yf) or 1,3,3,3-tetrafluoroprop-1-ene (HFO-1234ze), are thus also provided herein.

The conversion of chlorinated and/or fluorinated propene and higher alkenes to provide hydrofluoroolefins may broadly comprise a single reaction or two or more reactions involving fluorination of a compound of the formula $C(X)_mCCl(Y)_n(C)(X)_m$ to at least one compound of the formula $CF_3CF=CHZ$, where each X, Y and Z is independently H, F, Cl, I or Br, and each m is independently 1, 2 or 3 and n is 0 or 1. A more specific example might involve a multi-step process wherein a feedstock of 1,1,2,3 tetrachloropropene is fluorinated in a catalyzed, gas phase reaction to form a compound such as 2-chloro-3,3,3-trifluoropropene. The 2-chloro-2,3,3,3-tetrafluoropropane is then dehydrochlorinated to 2,3,3,3-tetrafluoropropene via a catalyzed, gas phase reaction.

EXAMPLE 1

A reactor with inner diameter of 6 ft is used to produce TCPE from the reaction of perchloroethylene and methyl chloride at a ¼ molar ratio of perchloroethylene to methyl chloride. The reactor has an effluent rate of 78,000 kg/hr of 8% TCPE at 400° C. and 260 psig, and is coupled to a weir quench as shown in FIG. 1, wherein the ratio of the reactor outlet inner diameter to the weir quench inlet inner diameter is one or greater.

Figure 4:
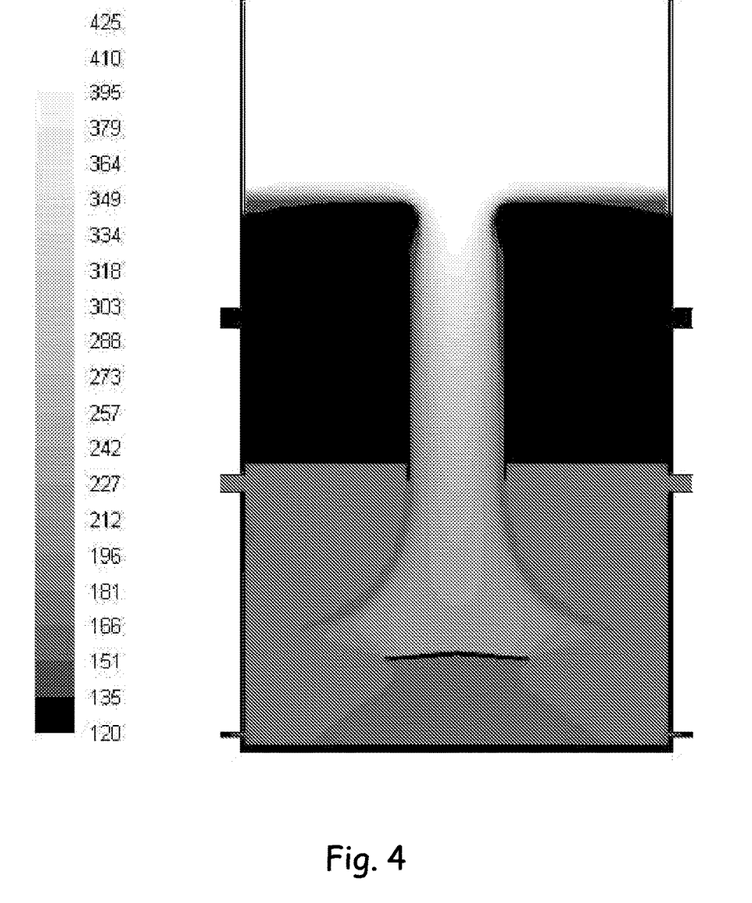
FIG. 4 provides temperature contours for a process operated using the weir quench embodiment shown in FIG. 1.

As can be seen in FIG. 4, the gaseous reactor effluent enters the weir quench at approximately 425° C. The quench fluid, comprising the product, enters the quench chamber at approximately 120° C. The liquid quench flows over the downcomer and wets the downcomer wall, thereby cooling as it surrounds the reactor gas effluent that is also flowing down the middle of the downcomer. The temperature gradient in the lower chamber shows that the effluent gas becomes cooled further as it reaches the roof baffle.

Figure 5A:
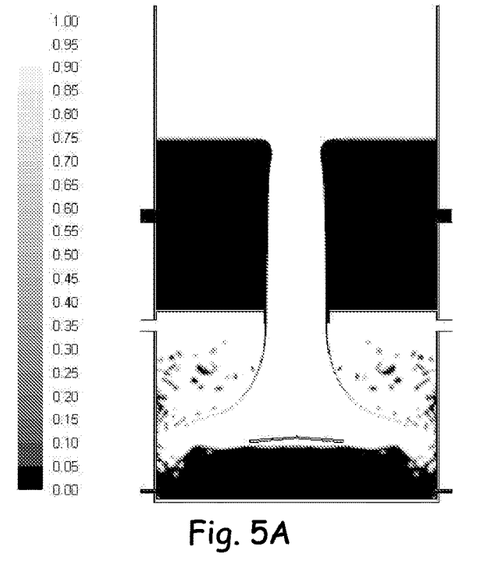
FIG. 5 provides a gas volume fraction contour (a) and velocity vectors (b) for a process operated using the weir quench embodiment shown in FIG. 1.
Figure 5B:
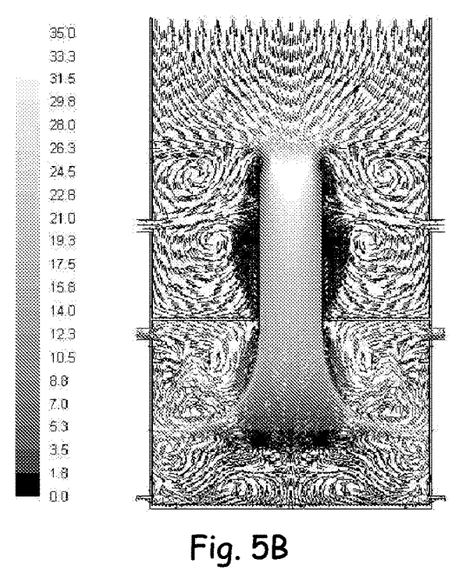

FIG. 5A shows the computational fluid dynamic simulation of the gas and liquid flow pattern while FIG. 5B shows the computational fluid dynamic simulation velocity vectors (right). These Figures show that the gas effluent has no or little back mixed zone as the gas enters the downcomer tube.

Figure 6:
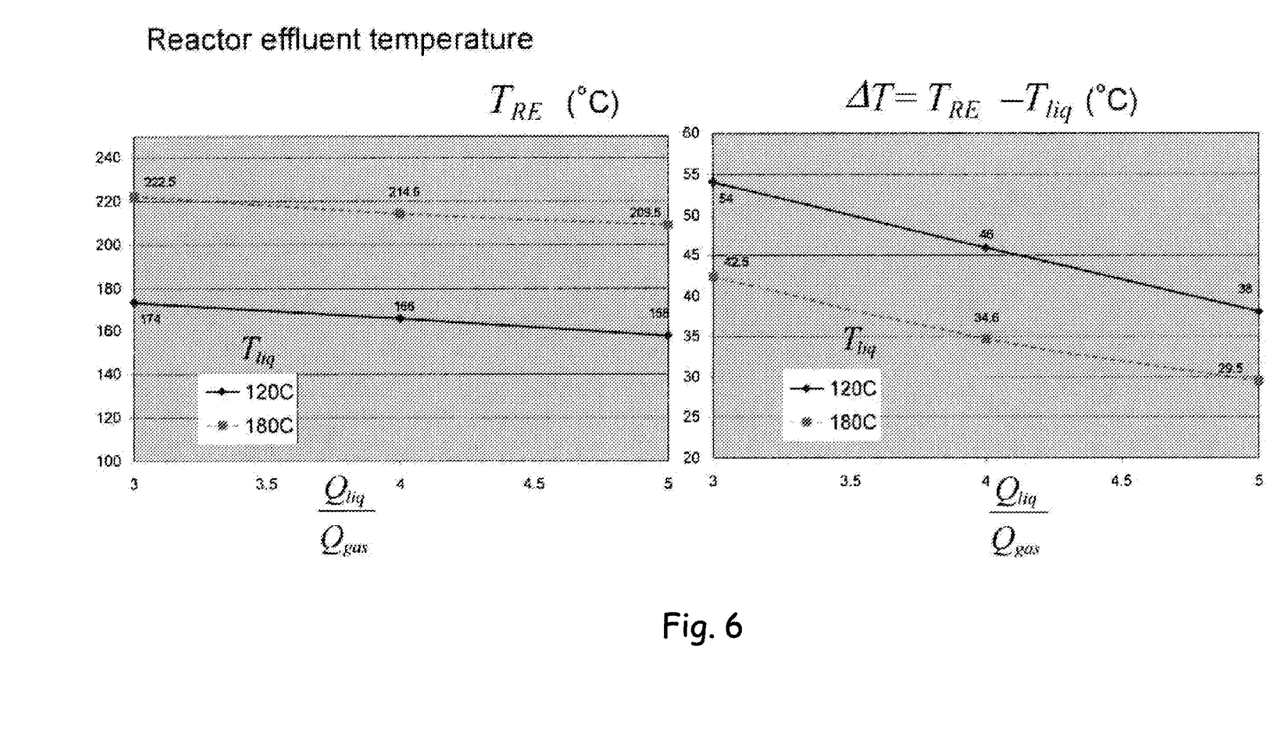
FIG. 6 provides graphical depictions of the effect of ratio of quench liquid flow and reactor effluent mass flow on the reactor product stream temperature (a) and its difference from the quench liquid temperature (b) for the embodiment shown in FIG. 1.

FIG. 6 shows the impact of varying the mass flow rate ratio of the liquid quench to the reactor effluent gas ($Q_{liq}/Q_{gas}$) on the reactor effluent average gas temperature ($T_{RE}$) and the difference between $T_{RE}$ and quench liquid average temperature ($T_{liq}$). Increasing $Q_{liq}/Q_{gas}$ ratio has the favorable impact of lowering the $T_{RE}$ at $T_{liq}$ entering the quench chamber at 120° C. and 180° C. For example, at 3 $Q_{liq}/Q_{gas}$ and 180° C. inlet liquid quench temperature, the $T_{RE}$ is expected to be at 223° C. as it exits the lower chamber. Similarly, at 120° C. inlet liquid quench temperature, $T_{RE}$ is expected to be at 174° C. The corresponding gas and liquid temperature difference $\Delta T$ is expected to be 54 and 43° C., respectively.

EXAMPLE 2

Figure 3B:
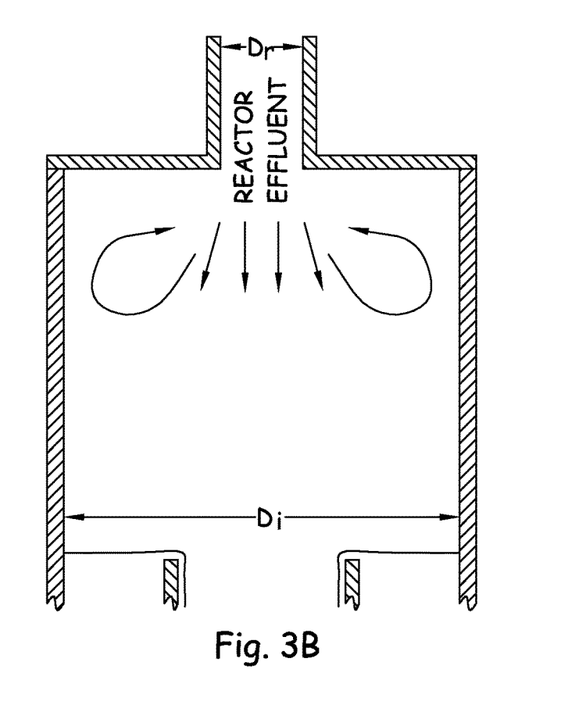
FIG. 3B is a schematic representation of a conventional weir quench fluidly connected to a reactor, wherein the ratio of the reactor outlet inner diameter ($D_r$) and the weir quench inlet inner diameter ($D_i$) is less than one.

The reaction and reactor system as described in example 1 is coupled with a conventional quench chamber typically used such that the reactor outlet diameter $D_r$ is less than the quench chamber inner diameter $D_i$ (case B in FIG. 3). This can be contrasted with the desired configuration at which $D_r$ is equal to $D_i$ as depicted in case A in FIG. 3. As a result of the backmixing zone provided in the convention arrangement, at the upper corner of the quench chamber in case B, further reactions can occur between the product(s) and/or reactants to produce higher molecular weight byproducts. This is expected to result in rapid fouling of the reactor outlet and the quench chamber.

The invention claimed is:

1. A weir quench comprising an inlet having an inner diameter, an upper chamber having an inner diameter and at least one downcomer tube having an inner diameter, wherein the inlet inner diameter is at least 90% of the upper chamber inner diameter and wherein the ratio of the inner diameter of the inlet to the downcomer tube inner diameter is greater than 3.

2. The weir quench of claim 1, wherein the ratio of the inlet inner diameter to the downcomer tube inner diameter is less than 6.

3. The weir quench of claim 2, wherein the ratio of the inlet inner diameter to the downcomer tube inner diameter is at least 4 and less than 5.

4. The weir quench of claim 1, wherein the at least one downcomer tube has an inner diameter of at least 1 inch.

5. The weir quench of claim 1, wherein the ratio of the downcomer tube length to the downcomer tube inner diameter is from 3 to 8.

6. The weir quench of claim 1, further comprising a lower chamber operatively disposed relative to the at least one downcomer tube, and wherein the lower chamber comprises a baffle.

7. The weir quench of claim 1, wherein the placement of the downcomer tube is at least 0.1 inch below the ceiling of the lower chamber quench outlet.

8. The weir quench of claim 1, wherein the lower quench outlet is at least one inch above the quench reservoir bottom.

9. An apparatus comprising: A reactor having an outlet with an inner diameter; and
   A weir quench fluidly connected to the reactor and having an inlet with an inner diameter, an upper chamber having an inner diameter and at least one downcomer tube having an inner diameter,
   Wherein the ratio of the reactor outlet inner diameter to the weir quench inlet inner diameter is greater than 1, the inlet inner diameter is at least 90% of the upper chamber inner diameter and wherein the ratio of the inner diameter of the inlet to the downcomer tube inner diameter is greater than 3.

10. The apparatus of claim 9, wherein the at least one downcomer tube has an inner diameter of at least 1 inch.

11. The apparatus of claim 9, wherein the ratio of the downcomer tube length to the downcomer tube inner diameter is from 3 to 8.

12. The apparatus of claim 9, further comprising a lower chamber operatively disposed relative to the at least one downcomer tube, and wherein the lower chamber comprises a baffle.

13. A process for quenching the gaseous product stream from a chemical process comprising a limiting reagent comprising:

Providing the gaseous product stream from a reactor having an outlet with an inner diameter to a weir quench with an inlet having an inner diameter, an upper chamber having an inner diameter and at least one downcomer tube having an inner diameter, wherein the ratio of the reactor outlet inner diameter to the weir quench inlet inner diameter is greater than one, the inlet inner diameter is at least 90% of the upper chamber inner diameter and wherein the ratio of the inner diameter of the inlet to the downcomer tube inner diameter is greater than 3.

14. The process of claim 13, further comprising using a reaction product as the quench flow.

15. The process of claim 13, wherein the mass flow ratio of the quench flow to the product stream is at least 2.

16. The process of claim 13, wherein the mass flow ratio of the quench flow to the product stream is less than 6.

17. The process of claim 13, wherein the flow velocity of the product stream is less than 10 ft./s.

18. The process of claim 13, wherein the temperature of the quench flow is greater than 20° C.

19. The process of claim 18, wherein the temperature of the quench flow is less than 250° C.

* * * * *